(12) United States Patent
Jo et al.

(10) Patent No.: US 9,015,445 B2
(45) Date of Patent: Apr. 21, 2015

(54) METHOD AND SYSTEM FOR MANIPULATING DATA

(71) Applicant: Samsung Electronics Co., Ltd., Suwon-si, Gyeonggi-do (KR)

(72) Inventors: Myung-hyun Jo, Seoul (KR); Chan-ik Park, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/921,341

(22) Filed: Jun. 19, 2013

(65) Prior Publication Data

US 2013/0283003 A1  Oct. 24, 2013

Related U.S. Application Data

(63) Continuation of application No. 12/815,445, filed on Jun. 15, 2010, now Pat. No. 8,489,852.

(30) Foreign Application Priority Data

Jul. 6, 2009 (KR) .................. 10-2009-0061145

(51) Int. Cl.
*G06F 12/00* (2006.01)
*G06F 12/02* (2006.01)

(52) U.S. Cl.
CPC ............ *G06F 12/00* (2013.01); *G06F 12/0246* (2013.01); *G06F 2212/7201* (2013.01); *Y02B 60/1225* (2013.01)

(58) Field of Classification Search
None
See application file for complete search history.

(56) References Cited

U.S. PATENT DOCUMENTS

| 5,119,290 A | 6/1992 | Loo et al. |
| 6,006,312 A | 12/1999 | Kohn et al. |
| 2005/0204104 A1 | 9/2005 | Aoshima et al. |
| 2006/0026385 A1 | 2/2006 | Dinechin et al. |
| 2010/0023682 A1 | 1/2010 | Lee et al. |

FOREIGN PATENT DOCUMENTS

| JP | 2007-018499 | 1/2007 |
| JP | 2007-066326 | 3/2007 |
| KR | 1020080056491 A | 6/2008 |
| WO | WO 98/44420 | 10/1998 |

*Primary Examiner* — Brian Peugh
(74) *Attorney, Agent, or Firm* — Volentine & Whitt, PLLC (57) ABSTRACT

A method of manipulating data includes receiving a data manipulation command for corresponding data, which corresponds to a first logical block address, to a second logical block address. The method further includes mapping the second logical block address to a physical block address, which is mapped to the first logical block address, in response to the data manipulation command. A system for manipulating data includes a host and a flash translation layer. The host transmits a data manipulation command for corresponding data, which corresponds to a first logical block address, to a second logical block address. The flash translation layer maps the second logical block address to a physical block address, which is mapped to the first logical block address, in response to the data manipulation command.

20 Claims, 9 Drawing Sheets

| LBA | PBA |
|---|---|
| 1 | A |
| 2 | B |
| 3 | C |
| 4 | D |

FIG. 7B

| LBA | PBA |
|---|---|
| 1 | A |
| 2 | A |
| 3 | B |
| 4 | C |

FIG. 7C

| LBA | PBA |
|---|---|
| 1 | N |
| 2 | A |
| 3 | B |
| 4 | C |

FIG. 9A

| LBA | PBA |
|---|---|
| 1 | A |
| 2 | A |
| 3 | A |
| 4 | B |
| 5 | B |
| 6 | C |
| 7 | D |

FIG. 9B

| PBA | LBA_LIST |
|---|---|
| A | (1, 2, 3) |
| B | (4, 5) |

FIG. 9C

| PBA | LBA_LIST |
|---|---|
| A | (2, 3) |
| B | (4, 5) |

FIG. 9D

| LBA | PBA |
|---|---|
| 1 | M |
| 2 | A |
| 3 | A |
| 4 | B |
| 5 | B |
| 6 | C |
| 7 | D |

FIG. 10

| COM | Source LBA | Target LBA | Sector Count |

FIG. 11

| Byte | Field | Value | Description |
|---|---|---|---|
| 0-1 | Action Code | 0006h | This action copy source data to target data |
| 2-3 | Function Code | 0000h | Reserved |
| | | 0001h | Copy from source data to target data |
| | | 0003h-FFFFh | Reserved |
| 4-7 | Source LBA | QWord | Source logical sector to copy |
| 8-11 | Target LBA | QWord | Target logical sector to copy |
| 12-15 | Sector Count | QWord | Number of logical sectors to copy |

FIG. 12

METHOD AND SYSTEM FOR MANIPULATING DATA

CROSS-REFERENCE TO RELATED APPLICATION(S)

This is a Continuation of application Ser. No. 12/815,445, filed Jun. 15, 2010, in which a claim of priority is made to Korean Patent Application No. 10-2009-0061145, filed on Jul. 6, 2009, in the Korean Intellectual Property Office, the disclosure of which is incorporated herein in its entirety by reference.

BACKGROUND

The inventive concept relates to a method and system for manipulating data, and more particularly, to a method and system for manipulating data in which a data manipulation command can be executed without transmitting and receiving data between a host and a storage device.

In general, a computer system (referred to as a system hereinafter) includes one or more storage devices. A host transmits a data manipulation command for manipulating data stored in the one or more storage devices.

Figure 1:
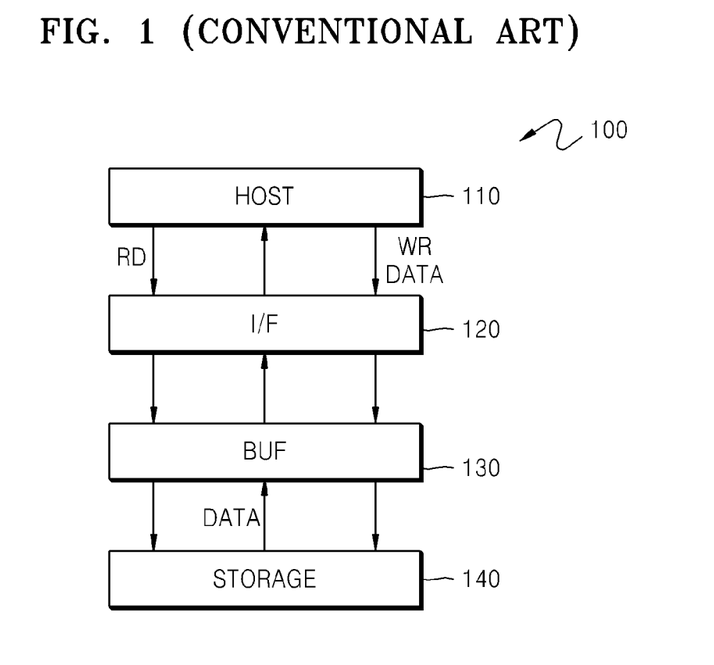
FIG. 1 is a signal flow diagram of a conventional method of manipulating data.

FIG. 1 is a signal flow diagram of a conventional method of manipulating data. In particular, FIG. 1 is for explaining the execution of a copy command in which data stored in an original location in a storage device 140 is copied to another location in the storage device 140.

Referring to FIG. 1, the conventional execution of a copy command includes steps of transmitting and receiving data between the storage device 140 and a host 110. In detail, in order to execute the copy command, the host 110 transmits a read command RD for reading data to be copied. The read command RD is transmitted to the storage device 140 through an interface 120 and a buffer 130, and data DATA stored in the storage device 140 is read by the storage device 140. The data DATA is transmitted to the host 110 through the buffer 130 and the interface 120. In order to copy the data DATA to a desired location in the storage device 140, the host 110 transmits a write command WR and the data DATA to the storage device 140 through the interface 120 and the buffer 130. The data DATA is stored in the desired location of the storage device 140. That is, the conventional method executes a copy command by reading data to be copied and then writing the data.

SUMMARY

According to an aspect of the inventive concept, there is provided a method of manipulating data. The method includes receiving a data manipulation command for corresponding data, which corresponds to a first logical block address, to a second logical block address. The method further includes mapping the second logical block address to a physical block address, which is mapped to the first logical block address, in response to the data manipulation command.

The method may further include determining whether mapping information between the first logical block address and the physical block address is stored in a duplicated mapping table. When it is determined that the mapping information is stored in the duplicated mapping table, the method may further include adding information about the second logical block address to a logical block address list corresponding to the physical block address. When it is determined that the mapping information is not stored in the duplicated mapping table, the method may further include storing information about the physical block address in the duplicated mapping table and storing information about the first and second logical block addresses in the logical block address list corresponding to the physical block address.

The method may further include receiving a command for correcting all or part of data corresponding to a predetermined logical block address from among the first and second logical block addresses is received, deleting information about the predetermined logical block address from the logical block address list corresponding to the physical block address, and mapping the predetermined logical block address to another physical block address.

The method may further include receiving a command for correcting all or part of data corresponding to a predetermined logical block address from among the first and second logical block addresses is received, and mapping the predetermined logical block address to another physical block address.

According to another aspect of the inventive concept, there is provided a system for manipulating data. The system includes a host and a flash translation layer. The host transmits a data manipulation command for corresponding data, which corresponds to a first logical block address, to a second logical block address. The flash translation layer maps the second logical block address to a physical block address, which is mapped to the first logical block address, in response to the data manipulation command.

The system may further include a memory storing a normal mapping table and a duplicated mapping table, wherein the normal mapping table contains mapping information between each logical block address and each physical block address. When a plurality of logical block addresses are mapped to a predetermined physical block address, the duplicated mapping table stores a logical block address list including information about the predetermined physical block address and the plurality of logical block addresses.

BRIEF DESCRIPTION OF THE DRAWINGS

Exemplary embodiments of the inventive concepts will be more clearly understood from the detailed description that follows, taken in conjunction with the accompanying drawings, in which.

DETAILED DESCRIPTION OF THE EMBODIMENTS

In order to fully understand operational advantages of the inventive concept and objects to be attained by embodiments of the inventive concept, the accompanying drawings illustrating exemplary embodiments of the inventive concept and details described in the accompanying drawings should be referred to.

The inventive concepts will now be described more fully with reference to the accompanying drawings. In the drawings, like reference numerals denote like elements.

Figure 2:
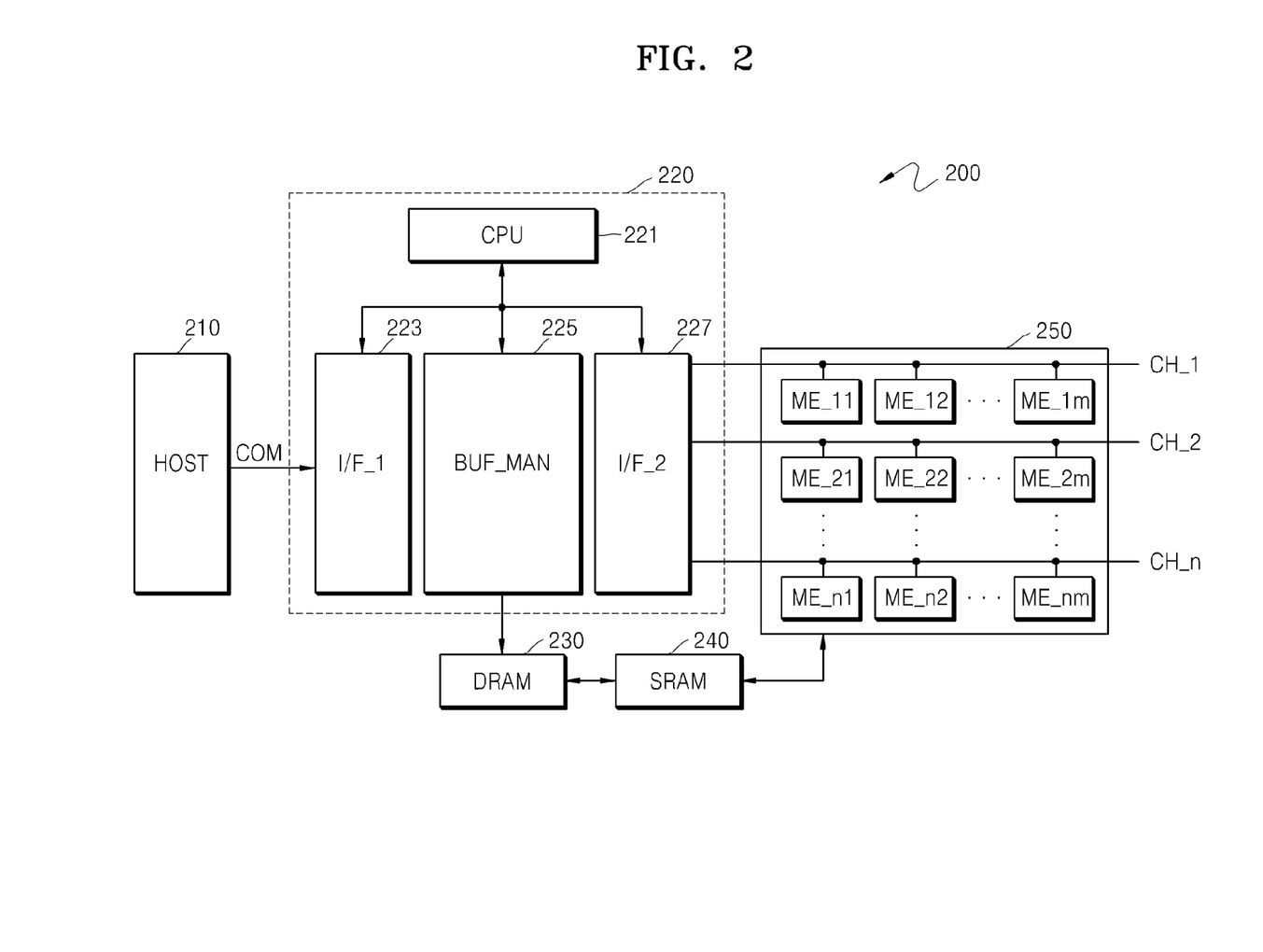
FIG. 2 is a block diagram of a system for manipulating data, according to an embodiment of the inventive concepts.

FIG. 2 is a block diagram of a system 200 for manipulating data, according to an embodiment of the inventive concepts.

Referring to FIG. 2, the system 200 includes a host 210, a control unit 220, a first memory 230, a second memory 240, and a storage device 250.

The host 210 transmits a predetermined command, for example, a data manipulation command COM. The data manipulation command COM may be a copy command or a move command for copying or moving data from a predetermined logical block address to another logical block address. However, the data manipulation command COM is not limited to the copy command or the move command, and the data manipulation command may be any command that can change an address without changing the content of data.

The control unit 220 may include a central processing unit (CPU) 221, a first interface 223, a buffer managing unit 225, and a second interface 227. The CPU 221 may control the first interface 223, the buffer managing unit 225, and the second interface 227. The first interface 223 may transmit and receive a command or data to and from the host 210, and is also referred to as a host interface. The buffer managing unit 225 may manage the first memory 230. The second interface 227 may transmit and receive a command or data to and from the storage device 250, and is also referred to as a flash interface.

The first memory 230 may buffer data read from the storage device 250 or data to be written to the storage device 250. Although the first memory 230 is a dynamic random access memory (DRAM) in FIG. 2, the inventive concepts are not limited thereto. Firmware may operate in the second memory 240. Although the second memory 240 is a static random access memory (SRAM) in FIG. 2, the inventive concepts are not limited thereto. The firmware will be explained in detail with reference to FIG. 3.

Data may be stored in the storage device 250. The storage device 250 may include a plurality of memory devices ME_11, ME_12, ..., ME_nm transmitting and receiving data through channels CH_1, CH_2, ..., CH_n. For example, the plurality of memory devices ME_11, ME_12, ..., ME_1m may transmit and receive data through the channel CH_1, and the plurality of memory devices M_21, ME_22, ..., ME_2m may transmit and receive data through the channel CH_2. The number of memory devices and the number of channels may be appropriately determined according to design specifications. The storage device 250 may be a non-volatile memory device.

Figure 3:
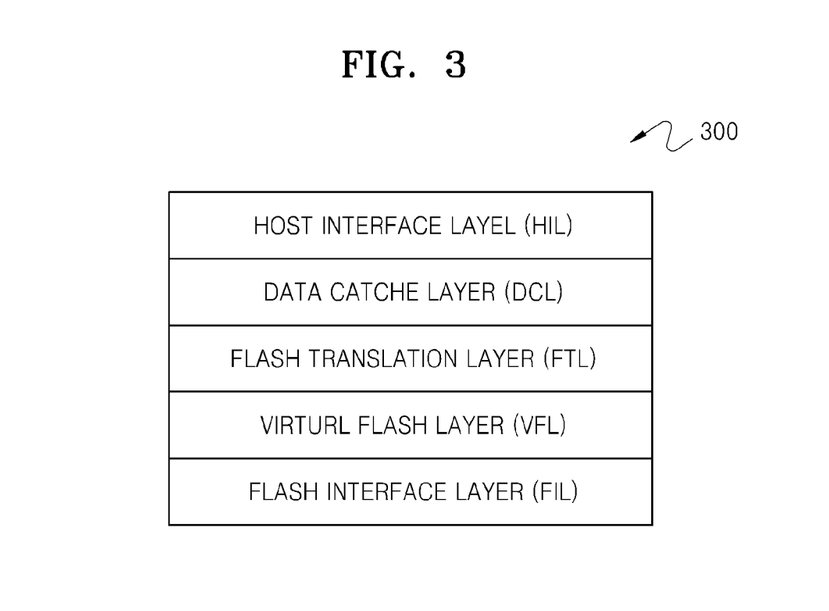
FIG. 3 illustrates a configuration of firmware.

FIG. 3 illustrates the configuration of firmware 300 operated in the second memory 240 of FIG. 2.

Referring to FIGS. 2 and 3, the firmware 300 may include a host interface layer HIL, a data cache layer DCL, a flash translation layer FTL, a virtual flash layer VFL, and a flash interface layer FIL.

If a command transmitted from the host 210 is received by the first interface 223, the first interface 223 decodes the command and records the command in a register. The host interface layer HIL receives information about the command recorded in the register through polling or interrupt driven input/output (I/O), and determines whether the command complies with a protocol. The data cache layer DCL buffers data read from the first memory 230 or data to be written to the flash memory 230. The flash translation layer FTL maps a logical block address LBA transmitted from the host 210 to a physical block address PBA that is the physical location of the storage device 250. The virtual flash layer VFL manages bad block information of the storage device 250. The flash interface layer FIL controls the second interface 227.

Figure 4:
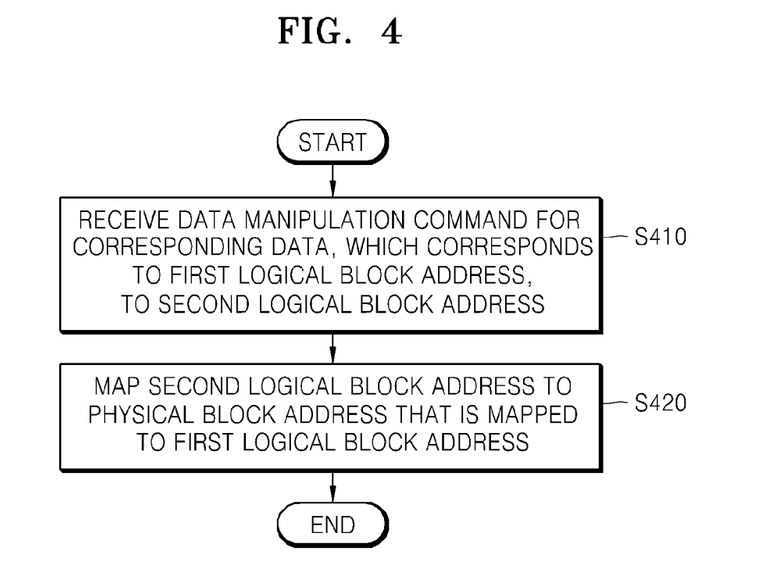
FIG. 4 is a flowchart illustrating a method of manipulating data, according to an embodiment of the inventive concepts.

FIG. 4 is a flowchart illustrating a method of manipulating data, according to an embodiment of the inventive concepts.

Referring to FIGS. 2 through 4, the host 210 transmits a data manipulation command COM. As described above, the data manipulation command COM can change an address without changing the content of data. For example, the data manipulation command COM may be a copy command or a move command.

In operation S410, the data manipulation command COM transmitted from the host 210 is received by the first interface 223. In operation S420, the flash translation layer FTL maps a second logical block address to a physical block address, which is mapped to a first logical block address, in response to the data manipulation command COM. Operation S420 may not be performed by the flash translation layer FTL, and any element that can map a logical block address to a physical block address may be used to perform operation S420. As a result of operation S420, the physical block address is mapped to both the first logical block address and the second logical block address. That is, a plurality of logical block addresses may be mapped to one physical block address in the method of FIG. 4.

Figure 5:
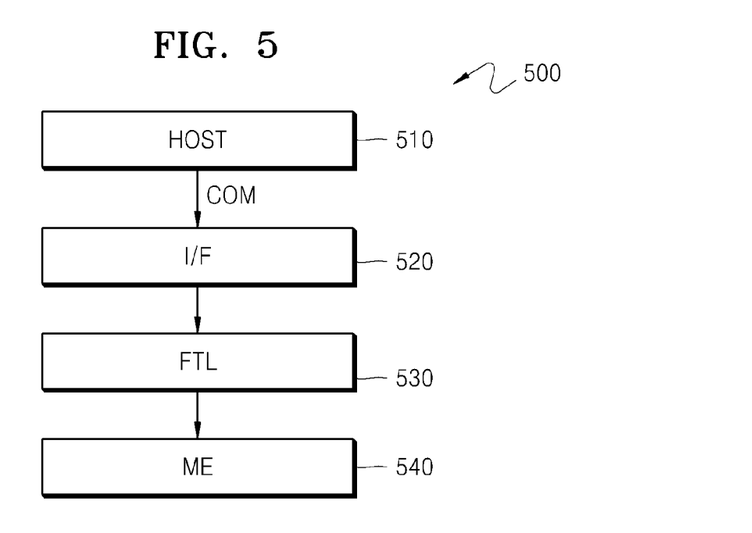
FIG. 5 is a signal flow diagram of the method of FIG. 4.

FIG. 5 illustrates a signal flow diagram of the method of FIG. 4.

Referring to FIG. 5, since data is not read from a storage device 540 and data is not written to the storage device 540 in the method of FIG. 4, data is not transmitted and received between the storage device 540 and a host 510 via the interface 520 and flash translation layer 530. That is, when compared to a conventional method of FIG. 1, the method of FIG. 4 does not require a time needed to read data from the storage device 540, write data to the storage device 540, and transmit and receive data between the storage device 540 and the host 510.

Figure 6:
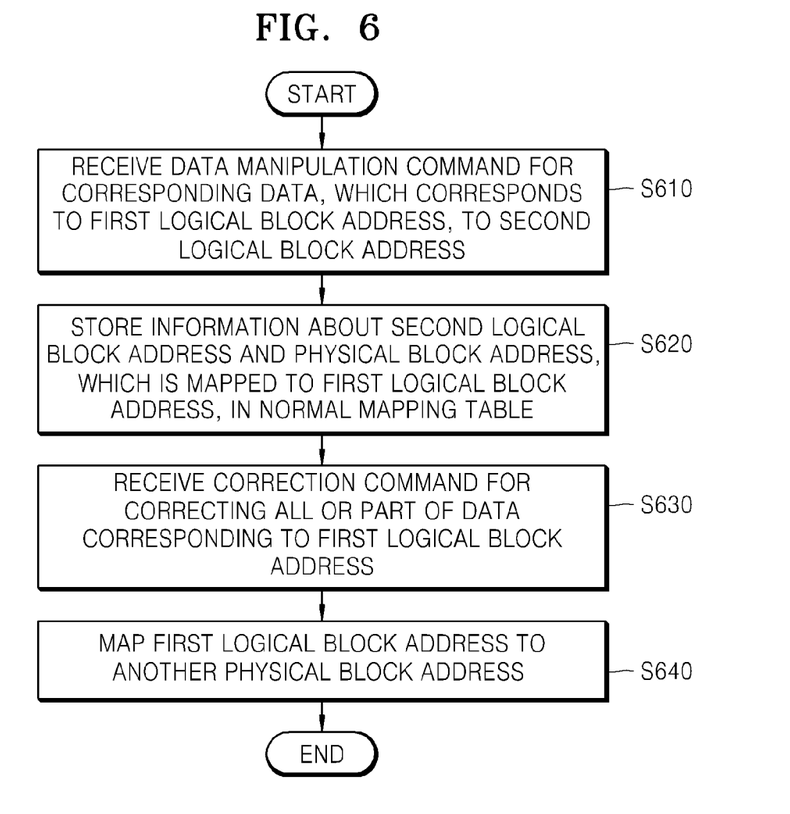
FIG. 6 is a flowchart illustrating a method of manipulating data, according to another embodiment of the inventive concepts.
Figure 7A:
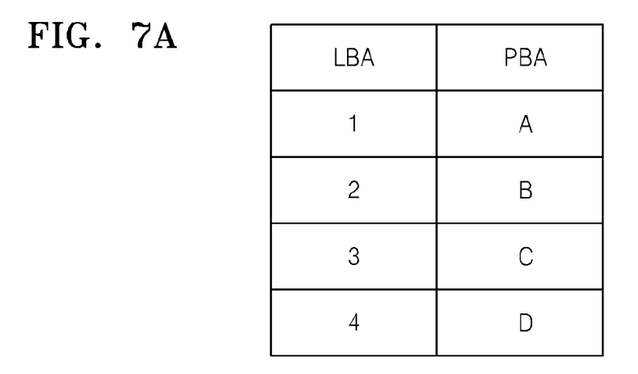
FIG. 7A illustrates a normal mapping table in the conventional art.
Figure 7B:
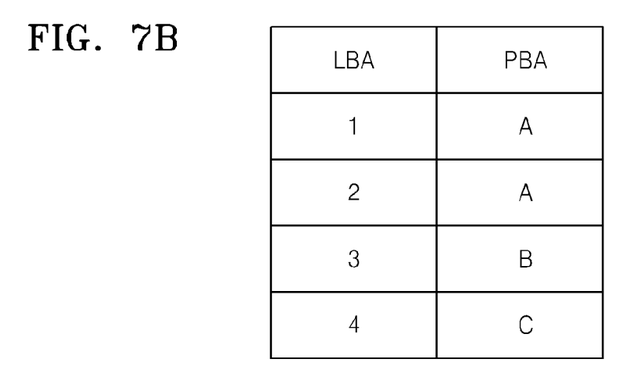
FIG. 7B illustrates a normal mapping table obtained after an information storage operation of the method of FIG. 6 is performed.
Figure 7C:
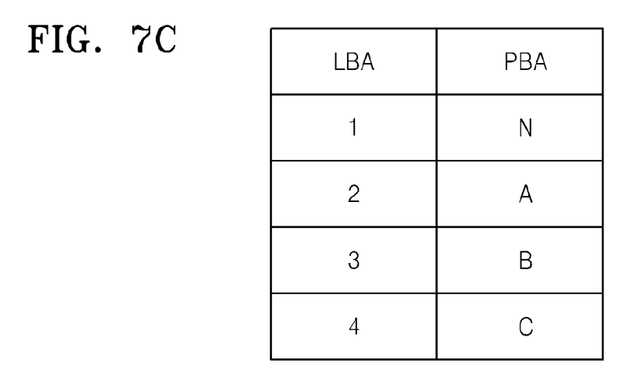
FIG. 7C illustrates a normal mapping table obtained after an address mapping operation of the method of FIG. 6 is performed.

FIG. 6 is a flowchart illustrating a method of manipulating data, according to another embodiment of the inventive concepts. FIG. 7A illustrates a normal mapping table in the conventional art. FIG. 7B illustrates a normal mapping table obtained after operation S620 of the method of FIG. 6 is performed. FIG. 7C illustrates a normal mapping table obtained after operation S640 of the method of FIG. 6 is performed.

Referring to FIGS. 2, 3, 6, and 7A through 7C, the host 210 transmits a data manipulation command COM. As described above, the data manipulation command COM can change an address without changing the content of data. For example, the data manipulation command COM may be a copy command or a move command.

In operation S610, the first interface 223 receives the data manipulation command COM transmitted from the host 210. In operation S620, the flash translation layer FTL stores information about a second logical block address and a physical block address, which is mapped to the first logical block address, in a normal mapping table in response to the data manipulation command COM. The normal mapping table may be stored in the second memory 240 of FIG. 2. However, the inventive concepts are not limited thereto, and as long as the flash translation layer FTL can manage the normal mapping table, the normal mapping table may be stored in another memory.

Since the first logical block address is mapped to the physical block address before the data manipulation command COM is received, the normal mapping table stores mapping information between the first logical block address and the physical block address before the data manipulation command COM is received. After the data manipulation command COM is received in operation S610, mapping information between the physical block address and the second logical block address is stored in the normal mapping table in operation S620. Although operation S620 is performed by the flash translation layer FTL, the inventive concepts are not limited thereto, and operation S620 may be performed by an element other than the flash translation layer FTL as described above.

The normal mapping table obtained after performing operation S620 is as shown in FIG. 7B. In FIG. 7B, a first logical block address and a second logical block address are mapped to a physical block address A. That is, each logical block address is mapped to each physical block address in a one-to-one manner in the conventional art as shown in FIG. 7A, whereas a plurality of block addresses can be mapped to one physical block address according to the method of FIG. 6 as shown in FIG. 7B.

Operations S630 and S640 relate to a case where after a plurality of logical block addresses are mapped to one physical block address, a command for correcting all or part of data corresponding to one logical block address from among the plurality of logical block addresses is received.

In operation S630, a correction command for correcting all or part of data corresponding to the first logical block address is received. In operation S640, the first logical block address is mapped to another physical block address. Referring to FIG. 7C, in order to correct all or part of the data corresponding to the first logical block address, the first logical block address is mapped to a physical block address N other than the physical block address A.

Operations S630 and S640 are performed when data cannot be overwritten to the storage device 250. That is, if data cannot be overwritten to the storage device 250 and all or part of the data needs to be corrected to obtain corrected data, a new physical block address is assigned to the corrected data, and the new physical address in which the corrected data is stored is mapped to a logical block address corresponding to the corrected data.

Figure 8:
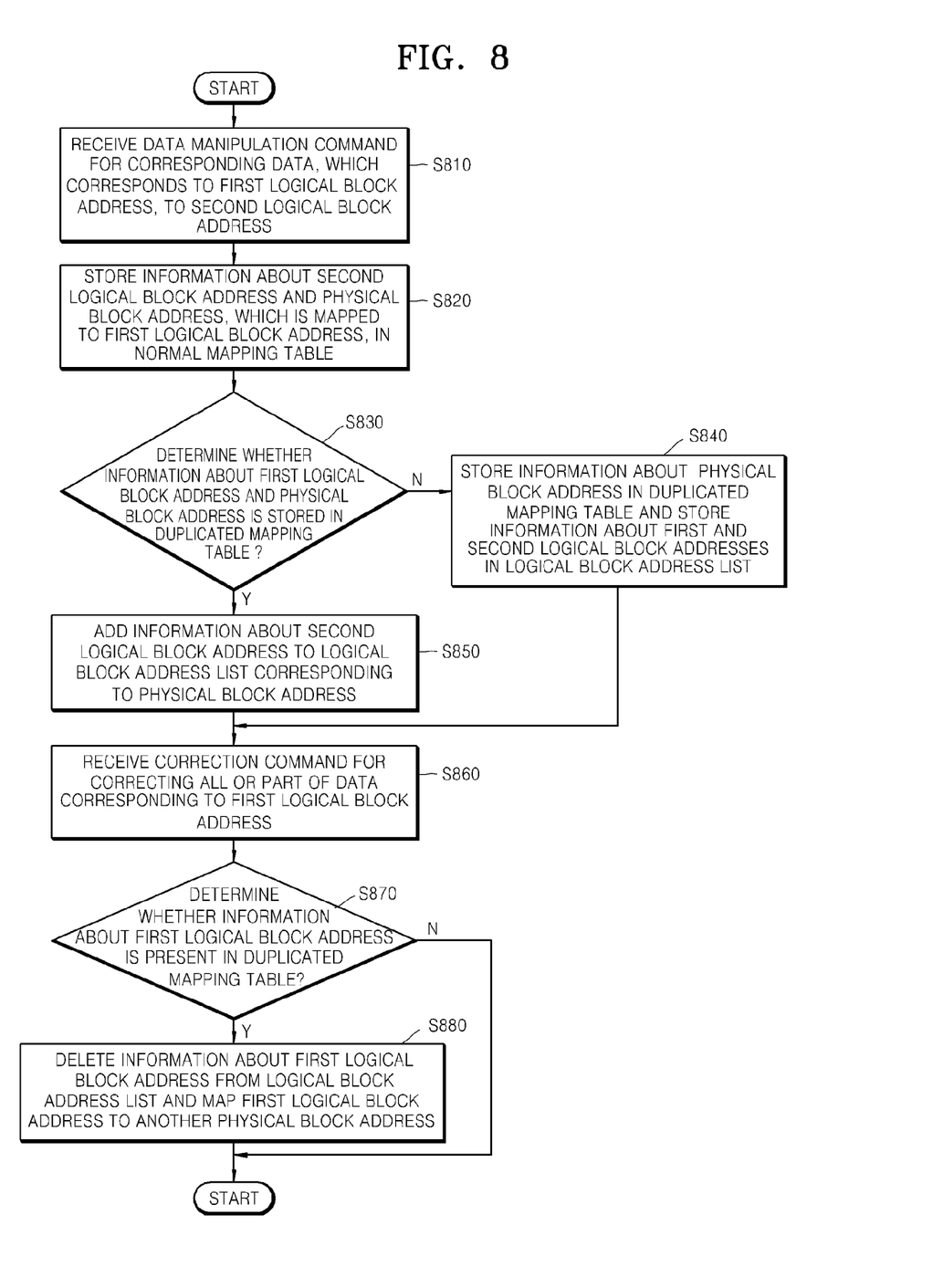
FIG. 8 is a flowchart illustrating a method of manipulating data, according to another embodiment of the inventive concepts.

FIG. 8 is a flowchart illustrating a method of manipulating data, according to another embodiment of the inventive concepts.

Figure 9A:
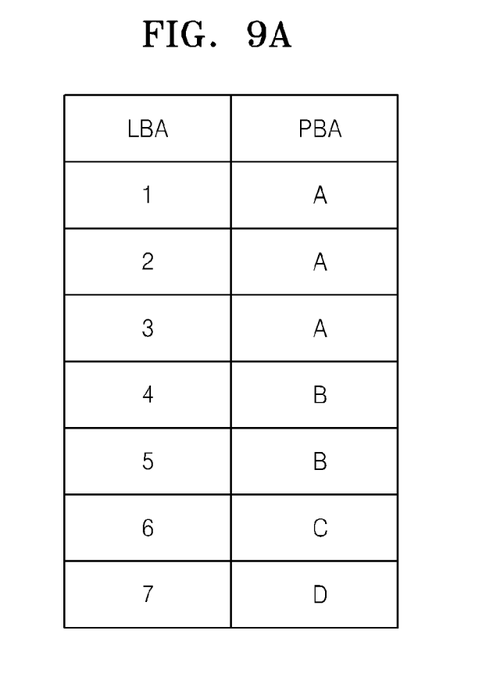
FIG. 9A illustrates a normal mapping table obtained after an information storage operation of the method of FIG. 8 is performed.
Figure 9B:
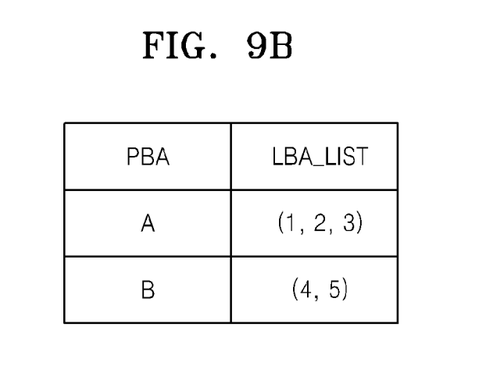
FIG. 9B illustrates a duplicated mapping table obtained after an information storage operation or an operation of adding information to a logical block address list, of the method of FIG. 8, is performed.
Figure 9C:
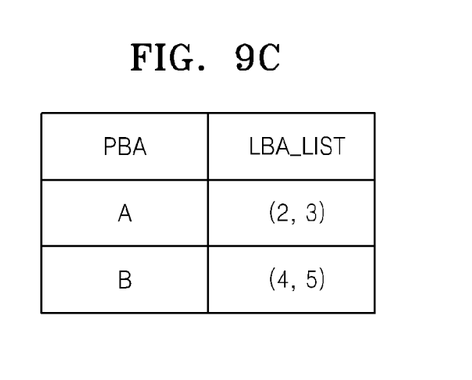
FIG. 9C illustrates a duplicated mapping table obtained after a determination is made as to whether information concerning a first logical block address is present in a duplicated mapping table in the method of FIG. 8.
Figure 9D:
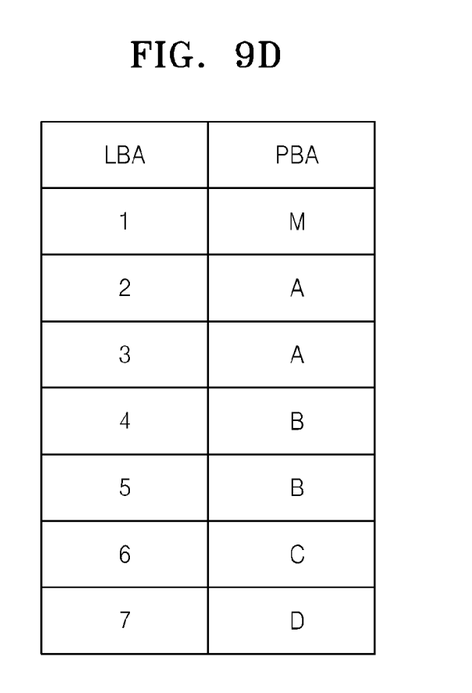
FIG. 9D illustrates a normal mapping table obtained after a determination is made as to whether information concerning a first logical block address is present in a duplicated mapping table in the method of FIG. 8.

FIG. 9A illustrates a normal mapping table obtained after operation S820 of the method of FIG. 8 is performed. FIG. 9B illustrates a duplicated mapping table obtained after operation S840 or S850 of the method of FIG. 8 is performed. FIG. 9C illustrates a duplicated mapping table obtained after operation S870 of the method of FIG. 8 is performed. FIG. 9D illustrates a normal mapping table obtained after operation S870 of the method of FIG. 8 is performed.

It is assumed that data can be overwritten to the storage device 250. Since operations S810 and S820 of FIG. 8 are the same as operations S610 and S620 of the method of FIG. 6, a detailed explanation of operations S810 and S820 will not be given here to avoid redundancy in the description.

Referring to FIGS. 2, 3, 6, 8, and 9A through 9D, a normal mapping table obtained after operation S820 is performed may be as shown in FIG. 9A. Referring to FIG. 9A, a first logical block address, a second logical block address, and a third logical block address are mapped to a physical block address A, a fourth block address and a fifth logical block address are mapped to a physical block address B, a sixth logical block address is mapped to a physical block address C, and a seventh logical block address is mapped to a physical block address D.

In FIG. 8, a duplicated mapping table as well as the normal mapping table may be stored in the second memory 240. Like the normal mapping table, the duplicated mapping table does not have to be stored in the second memory 240. In operation S830, it is determined whether information about the first logical block address and the physical block address A is stored in the duplicated mapping table. If it is determined in operation S830 that the information about the first logical block address and the physical block address A is not stored in the duplicated mapping table, the method proceeds to operation S840. In operation S840, the information about the physical block address A is stored in the duplicated mapping table, and information about the first and second logical block addresses is stored in a logical block address list corresponding to the physical block address A. If it is determined in operation S830, however, that the information about the first logical block address and the physical block address A is stored in the duplicated mapping table, the method proceeds to operation S850. In operation S850, the information about the second logical block address is added to the logical block address list corresponding to the physical block address A.

For example, in FIG. 9A, it is assumed that only the fourth logical block address is mapped to the physical block address B. In this case, since a plurality of logical block addresses are not mapped to one physical block address, information about the fourth logical block address and the physical block address B is not stored in the duplicated mapping table. Next, it is assumed that a data manipulation command for corresponding data, which corresponds to the fourth logical block address, to the fifth logical block address is received.

In this case, since the fifth logical block address is mapped to the physical block address B, mapping information between the fifth logical block address and the physical block address B is stored in the normal mapping table as shown in FIG. 9A. Since the information about the fourth logical block address and the physical block address B is not stored in the duplicated mapping table, operation S840 is performed so that the information about the physical block address B is stored in the duplicated mapping table as shown in FIG. 9B. Due to operation S840, the information about the fourth and fifth logical block addresses is stored in a logical block address list corresponding to the physical block address B.

Alternatively, in FIG. 9A, it is assumed that the first and second logical block addresses are mapped to the physical block address A and the third logical block address is not mapped to the physical block address A. In this case, since a plurality of logical block addresses are mapped to one physical block address, a logical block address list including information about the physical block address A and the first and second logical block addresses is stored in a duplicated mapping table. Next, it is assumed that a data manipulation command for corresponding data, which corresponds to the first logical block address, to the third logical block address is received. In this case, since the third logical block address is mapped to the physical block address A, mapping information between the third logical block address and the physical block address A is stored in the normal mapping table as shown in FIG. 9A. Since the information about the first logical block address and the physical block address A is stored in the duplicated mapping table, operation S850 is performed so that information about the third logical block address is added to a logical block address list corresponding to the physical block address A. That is, as shown in FIG. 9B, the information about the first through third logical block addresses is stored in the logical block address list corresponding to the physical block address A.

Operations S860 through S880 relate to a case where after a plurality of logical block addresses are mapped to one physical block address, and a command for correcting all or part of data corresponding to one logical block address from among the plurality of logical block addresses is received.

In operation S860, a correction command for correcting all or part of data corresponding to the first logical block address is received. In operation S870, it is determined whether information about the first logical block address is present in the duplicated mapping table. If it is determined in operation S870 that the information about the first logical block address is present in the duplicated mapping table, the method proceeds to operation S880. In operation S880, the information about the first logical block address is deleted from the logical address list stored in the duplicated mapping table, and the first logical block address is mapped to another physical block address.

For example, if a correction command for correcting data corresponding to the first logical block address is received when the duplicated mapping table is as shown in FIG. 9B, the first logical block address is deleted from the logical address list corresponding to the physical block address A mapped to the first logical block address. Hence, only information about the second and third logical block addresses is stored in the logical block address list corresponding to the physical block address A as shown in FIG. 9C. If the correction command is received when the normal mapping table is as shown in FIG. 9A, since the data corresponding to the first logical block address is corrected and is stored in a physical block address M, and the first logical block address is mapped to the physical block address M, the normal mapping table is as shown in FIG. 9D.

If it is determined in operation S870, however, that the information about the first logical block address is not present in the duplicated mapping table, since corrected data does not need to be stored in a new physical block address, new address mapping is not necessary.

For example, if a correction command for correcting data corresponding to the sixth logical block address is received when the duplicated mapping table is as shown in FIG. 9B, data of a physical block address C mapped to the sixth logical block address is corrected without performing new address mapping.

Figure 10:
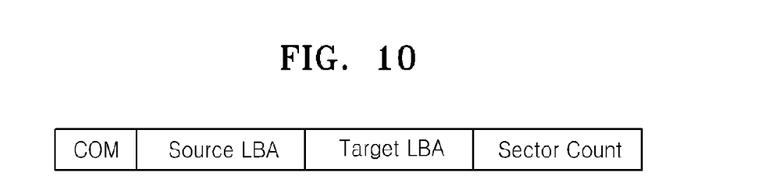
FIG. 10 illustrates a data manipulation command of the system of FIG. 2, according to an embodiment of the inventive concepts.

FIG. 10 illustrates a data manipulation command COM of the system of FIG. 2, according to an embodiment of the inventive concepts.

Referring to FIG. 10, the data manipulation command COM of this example includes a source logical block address SOURCE LBA, a target logical block address TARGET LBA, and data size information SECTOR COUNT. For example, if the data manipulation command COM is a copy command for copying data from a first logical block address to a second logical block address, the source logical block address SOURCE LBA is the first logical block address, and the target logical block address TARGET LBA is the second logical block address. However, the inventive concepts are not limited thereto, and as long as the data manipulation command COM has the same effect as stated above, the data manipulation command COM may be another kind of command other than the specific example of FIG. 10.

Figure 11:
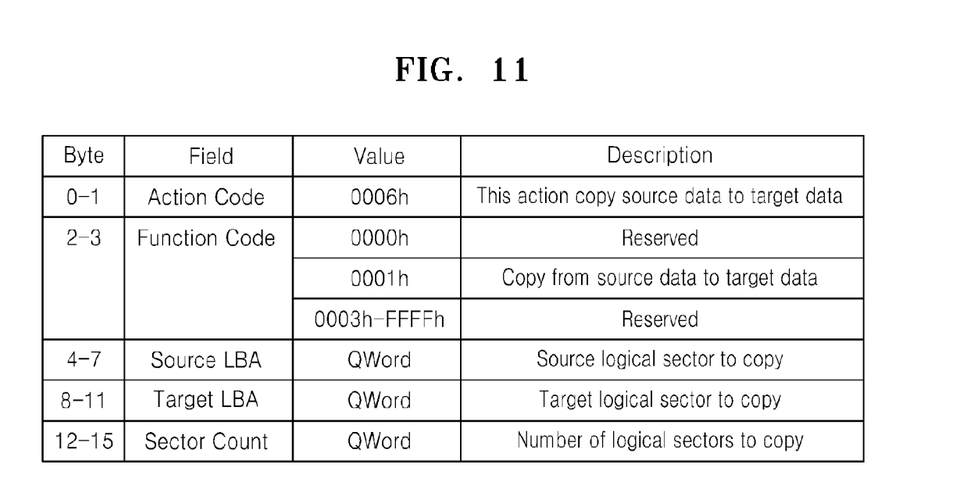
FIG. 11 illustrates a data manipulation command of the system of FIG. 2, according to another embodiment of the inventive concepts.

FIG. 11 illustrates a data manipulation command COM of the system of FIG. 2, according to another embodiment of the inventive concepts.

FIG. 11 illustrates an example in which the data manipulation command COM is configured using smart command transport (SCT) of advanced technology attachment 8-ATA/ATAPI command set (ATA8-ACS). Referring to FIG. 11, an action code ACTION CODE and a function code FUNCTION CODE determine the type of the data manipulation command COM, for example, a copy command or a move command. Since a source logical block address SOURCE LBA, a target logical block address TARGET LBA, and data size information SECTOR COUNT are the same as those shown in FIG. 10, a detailed explanation thereof will not be given here. Although FIG. 11 illustrates the data manipulation command COM, the inventive concepts are not limited thereto, and the data manipulation command COM may be another kind of command other than the specific example of FIG. 11.

Figure 12:
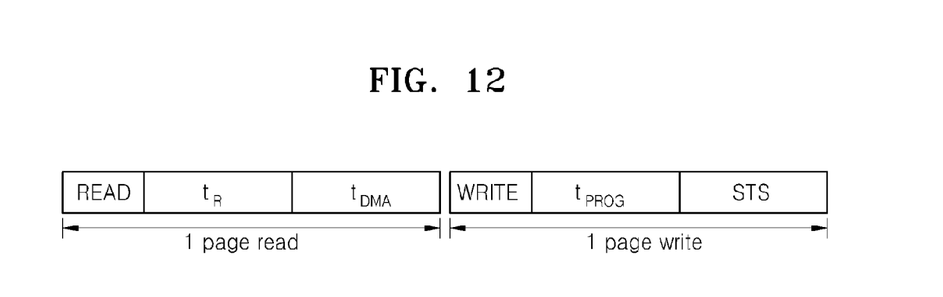
FIG. 12 illustrates a time taken to execute a data manipulation command in the conventional art.

FIG. 12 illustrates a time taken to execute a data manipulation command in the conventional method of FIG. 1.

Referring to FIGS. 1 and 12, in order to execute a data manipulation command for copying or moving data, the conventional method executes a read and write of data as described above. The read operation requires a time READ taken to receive a read command RD, a time $t_R$ taken for a storage device 140 to execute the read command RD, and a time $t_{DMA}$ taken to access data DATA between the storage device 140 and a buffer 130. The write operation requires a time WRITE taken to receive a write command WR and the data DATA to be written, a time $T_{PROG}$ taken for the storage device 140 to execute the write command WR, and a time STS taken to confirm that the write operation has been normally performed. Since the conventional method involves the read operation and the write operation in order to execute the data manipulation command, the times shown in FIG. 12 are expended. However, since the methods according to the inventive concepts do not perform such a read operation and a write operation, the execution times of FIG. 12 are not necessary.

While the inventive concepts have been particularly shown and described with reference to exemplary embodiments thereof, it will be understood by those of ordinary skill in the art that various changes in form and detail may be made therein without departing from the spirit and scope of the inventive concept as defined by the following claims. The preferred embodiments should be considered in a descriptive sense only and not for purposes of limitation. Therefore, the scope of the inventive concepts is defined not by the detailed description of the inventive concepts but by the appended claims, and all differences within the scope will be construed as being included in the inventive concepts.

What is claimed is:

1. A method of manipulating data, the method comprising:
    receiving a data manipulation command comprising a first logical address and a second logical address from a host; and
    mapping the second logical address to a physical address of a non-volatile memory device which stores data corresponding to the first logical address, in response to the data manipulation command,
    wherein the method is devoid of any reading or writing of the data stored at the physical address of the non-volatile memory device in response to the data manipulation command.

2. The method of claim 1, further comprising:
    receiving a command for correcting all or part of data corresponding to a logical address from among the first and second logical addresses; and
    mapping the logical address to a physical address different from the physical address of the non-volatile memory device which stores the data.

3. The method of claim 1, further comprising:
    determining whether mapping information between the first logical address and the physical address is stored in a duplicated mapping table;
    adding information about the second logical address to a logical address list corresponding to the physical address, when it is determined that the mapping information is stored in the duplicated mapping table; and
    storing information about the physical address in the duplicated mapping table and storing information about the first and second logical addresses in the logical address list corresponding to the physical address, when it is determined that the mapping information is not stored in the duplicated mapping table.

4. The method of claim 3, further comprising:
    receiving a command for correcting all or part of data corresponding to a logical address from among the first and second logical addresses,
    deleting the logical address from the logical address list corresponding to the physical address; and
    mapping the logical address to a physical address different from the physical address of the non-volatile memory device which stores the data.

5. A storage device comprising:
    a control unit comprising an interface configured to receive a data manipulation command;
    a random access memory configured to store mapping information of a logical address associated with a physical address; and
    a non-volatile memory device configured to store data corresponding to the data manipulation command,
    wherein the control unit is operatively devoid of any reading of the data stored at the non-volatile memory device in response to the data manipulation command and maps a first physical address mapped to a first logical address to a second logical address so as to correspond to data stored in the first physical address.

6. The storage device of claim 5, wherein the control unit does not incur an operation of reading or writing the data stored in the non-volatile memory device in response to the data manipulation command.

7. The storage device of claim 5, wherein the control unit stores a normal mapping table and a duplicated mapping table in the random access memory,
    wherein the normal mapping table stores mapping information of each logical address and each physical address,
    wherein, when a plurality of logical addresses are mapped to a physical address, the duplicated mapping table stores a logical address list including information about the physical address and the plurality of logical addresses.

8. The storage device of claim 7, wherein the control unit adds information about the second logical address to the logical address list corresponding to the physical address, when mapping information of the first logical address and the physical address is stored in the duplicated mapping table, and stores information about the physical address in the duplicated mapping table and stores information about the first and second logical addresses in the logical address list corresponding to the physical address, when the mapping information of the first logical address and the physical address is not stored in the duplicated mapping table.

9. The storage device of claim 8, wherein, when the control unit receives a command for correcting all or part of data stored in a physical address of the non-volatile memory device corresponding to a logical address from among the first and second logical addresses, the control unit deletes information about the logical address from the logical address list corresponding to the physical address and stores mapping information of a physical address different from the logical address in the normal mapping table.

10. The storage device of claim 8, wherein, when the control unit receives a command for correcting all or part of data corresponding to a logical address from among the first and second logical addresses, the control unit stores mapping information of a physical address different from a physical address of the non-volatile memory device which stores the data in the normal mapping table.

11. The storage device of claim 5, wherein the control unit comprises:
    a first interface configured to transmit and receive a command or data to and from a host;
    a second interface configured to transmit and receive a command or data to and from the non-volatile memory device;
    a buffer managing unit managing the random access memory; and
    a central processing device managing mapping information to map the second logical address to a physical address mapped to the first logical address in response to the data manipulation command.

12. The storage device of claim 11, wherein the central processing device manages the first interface, the second interface, and the buffer managing unit to transmit and receive the command or the data to and from the host or the non-volatile memory device.

13. The storage device of claim 5, wherein the non-volatile memory device further comprises a plurality of non-volatile memory devices, wherein the plurality of non-volatile memory devices are connected to the control unit through a plurality of channels.

14. The storage device of claim 5, wherein the mapping of the control unit is performed in a flash translation layer.

15. A system comprising:
a host transmitting a data manipulation command comprising a first logical address and a second logical address; and
a storage device mapping the second logical address to a physical address of a non-volatile memory device which stores data corresponding to the first logical address, in response to the data manipulation command,
wherein the system is devoid of any operation of reading or writing the data stored at the physical address of the non-volatile memory device in response to the data manipulation command.

16. The system of claim 15, wherein the storage device comprises:
a control unit comprising an interfaced configured to receive a data manipulation command;
a random access memory configured to store mapping information of a logical address associated with a physical address; and
a non-volatile memory device configured to store data corresponding to the data manipulation command,
wherein the control unit does not read the stored at the non-volatile memory device in response to the data manipulation command and maps a first physical address mapped to a first logical address to a second logical address so as to correspond to data stored in the first physical address.

17. The system of claim 16, wherein the control unit stores a normal mapping table and a duplicated mapping table in the random access memory,
wherein the normal mapping table stores mapping information of each logical address and each physical address,
wherein, when a plurality of logical addresses are mapped to a physical address, the duplicated mapping table stores a logical address list including information about the physical address and the plurality of logical addresses.

18. The system of claim 17, wherein the control unit adds information about the second logical address to the logical address list corresponding to the physical address, when mapping information of the first logical address and the physical address is stored in the duplicated mapping table, and stores information about the physical address in the duplicated mapping table and stores information about the first and second logical addresses in the logical address list corresponding to the physical address, when the mapping information of the first logical address and the physical address is not stored in the duplicated mapping table.

19. The system of claim 18, wherein, when the control unit receives a command for correcting all or part of data stored in a physical address of the non-volatile memory device corresponding to a logical address from among the first and second logical addresses, the control unit deletes information about the logical address from the logical address list corresponding to the physical address and stores mapping information of a physical address different from the logical address in the normal mapping table.

20. The system of claim 18, wherein, when the control unit receives a command for correcting all or part of data corresponding to a logical address from among the first and second logical addresses, the control unit stores mapping information of a physical address different from a physical address of the non-volatile memory device which stores the data in the normal mapping table.

\* \* \* \* \*